(12) United States Patent
Lynch

(10) Patent No.: US 11,242,252 B2
(45) Date of Patent: Feb. 8, 2022

(54) REFINING PROCESS FOR PRODUCING SOLAR SILICON, SILICON CARBIDE, HIGH-PURITY GRAPHITE AND HOLLOW SILICA MICROSPHERES

(71) Applicant: David Charles Lynch, Tucson, AZ (US)

(72) Inventor: David Charles Lynch, Tucson, AZ (US)

(73) Assignee: Plassein Technologies Ltd. LLC, Las Vegas, NV (US)

( * ) Notice: Subject to any disclaimer, the term of this patent is extended or adjusted under 35 U.S.C. 154(b) by 434 days.

(21) Appl. No.: 15/399,592

(22) Filed: Jan. 5, 2017

(65) Prior Publication Data

US 2018/0044186 A1 Feb. 15, 2018

Related U.S. Application Data

(60) Provisional application No. 62/390,884, filed on Apr. 13, 2016, provisional application No. 62/387,860, filed on Jan. 8, 2016.

(51) Int. Cl.
*C01B 33/025* (2006.01)
*C01B 33/18* (2006.01)
*C01B 32/20* (2017.01)
*C01B 32/956* (2017.01)

(52) U.S. Cl.
CPC ............ *C01B 33/025* (2013.01); *C01B 32/20* (2017.08); *C01B 32/956* (2017.08); *C01B 33/181* (2013.01); *C01P 2004/34* (2013.01); *C01P 2006/80* (2013.01)

(58) Field of Classification Search
CPC ..... C01B 33/025; C01B 32/956; C01B 32/20; C01B 33/181
See application file for complete search history.

(56) References Cited

U.S. PATENT DOCUMENTS

| 4,680,096 A * | 7/1987 | Dosaj ................... C01B 33/025 204/164 |
| 8,253,057 B1 * | 8/2012 | Hunt ....................... H05H 1/46 219/121.36 |
| 2008/0314446 A1 * | 12/2008 | McNulty ............... C01B 33/025 136/261 |

OTHER PUBLICATIONS

Coldwell et al (The Reduction of SiO2 with Carbon in a Plasma, J Electrochem. Soc. 124 (1977) pp. 1686-1689) (Year: 1977).*

* cited by examiner

*Primary Examiner* — Sheng H Davis
*Assistant Examiner* — Michael Forrest
(74) *Attorney, Agent, or Firm* — Larry E. Henneman, Jr.; Henneman & Associates, PLC

(57) ABSTRACT

A process for producing solar grade silicon from silica sand employs a plurality of plasma furnaces to perform a sequence of chemical reactions together with other process steps to produce solar grade silicon. The plasma furnace generates a stable dirty air, donut-shaped plasma into which particulate matter can be introduced. The plasma in the first two stages is formed by gases from the chemical reactions and in the third from inert gasses. Cyclone separators are used to extract particulates from the plasma in an inert gas that prevents reverse reactions as the particular cools.

36 Claims, 11 Drawing Sheets

Reactions:

$SiO_2(l) + Si(l) = 2SiO(g)$ (occurs in cavity)*

$SiO(g) + 2C(s) = SiC(s) + CO(g)$ (occurs in upper bed)

$SiO(g) + SiC(s) = 2Si(l) + CO(g)$ (occurs in cavity)*

Overall Reaction:

$SiO_2 + 2C = Si + 2CO(g)$

* Reactions occur simultaneously when silica flows down sidewalls of SiC.

Option # 1

Granular or powdered silica ore containing separate impurity minerals and impurities in the silica.

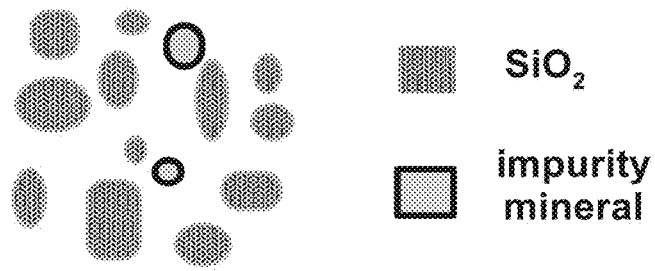

Fig. 4A

Physical means (shaker table, magnetic filter, or electrostatic separator) used to rmove the separate impurity minerals.

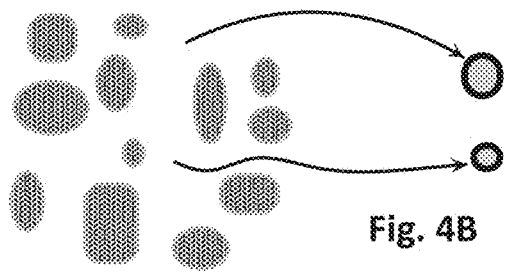

Fig. 4B

Option 2 (JHQ-3)

(Simplified Drawing for Representation of Chemical Reactions)

The chemistry presented here is essential in producing a commercial product. While the title is for an "Option", the option is that the chemical reactions presented are accomplished in a separate step or can be incorporated into the operation in the plasma furnace, JHQ-2.

Particles of SiC and $SiO_2$ must have their size reduced to less than 5 microns. By adding silica and increasing the temperature of the particulate to above 1900°C, and at ambient pressure, reaction between Si and $SiO_2$ to produce SiO(g) reduces the size of silica particles. Further more, the SiO(g) reacts with SiC producing Si and CO(g), thereby reducing the size of carbide particles.

$Si + SiO_2 \longrightarrow 2SiO(g)$ $SiO(g) = SiC \longrightarrow 2Si + CO(g)$

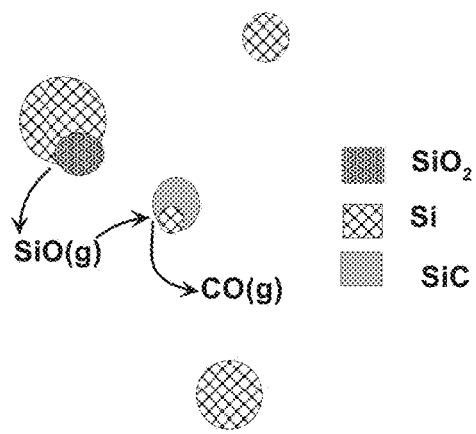

Fig. 4C

JHQ-1 Plasma Furnace (SiC Formation)

(Simplified Drawing for Representation of Chemical Reactions)

Increasing Temperature

Upon heating carbon reacts directly with both Si & SiO$_2$ where there is contact. These reaction tend to be slow, and they also tend to trap impurities, initially in the silica, in the carbide. The C/SiO$_2$ reaction can't be stopped at temps. above 1,521°C & ambient pressure.

Si + C → SiC

SiO$_2$ + 3C → SiC + 2CO(g)

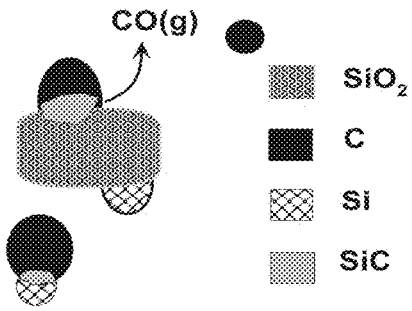

At temperatures above 1800°C Si reacts with SiO$_2$ to produce SiO(g). Any contact between SiC and SiO$_2$ leads to formation of SiO(g) and CO(g). The SiO(g) reacts with C to produce SiC and CO(g).

Si + SiO$_2$ → 2SiO(g)

Impurities in the silica disolve in the molten Si. As the Si is consumed by the reaction the impurities are volatilized.

2SiO$_2$ + SiC → 3SiO(g) + 2CO(g)

This reaction volatilizes impurities that are in both solids.

2C + SiO(g) → SiC + CO(g)

The volatilized impurities would dissolve in SiC except for the presence of the getter.

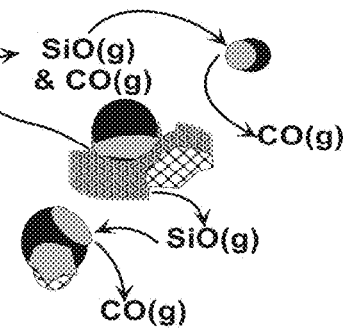

Reaction between CO(g) and SiO$_2$ in production of SiO(g) and CO$_2$(g) becomes important at temperatures above 2300°C. That reaction continues to proceed as long as both SiO(g) and CO$_2$(g) react with C; the reaction products are CO(g) and SiC.

CO(g) + SiO$_2$ → SiO(g) + CO$_2$(g)

This reaction releases impurities in the silica to the vapor phase.

CO$_2$(g) + C → 2CO(g)

SiO(g) + 2C → SiC + CO(g)

The final products are CO(g) and SiC. There will be some residual SiO$_2$ and C.

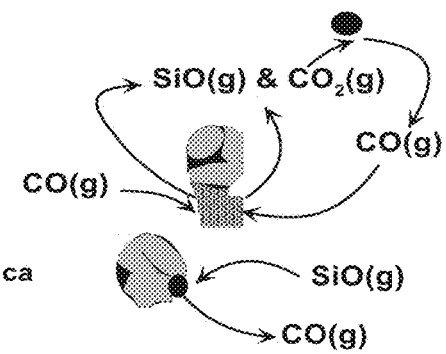

Fig. 6

JHQ-1 Plasma Furnace (Impurity Elimination)

(Simplified Drawing for Representation of Chemical Reactions))

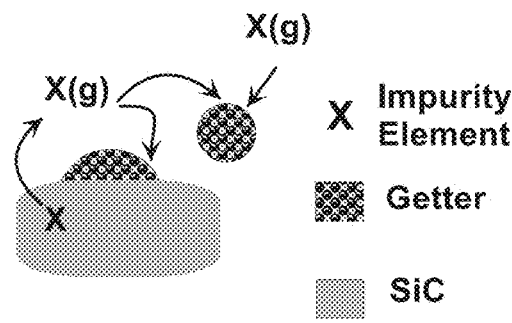

Impurity elements (X) originally locked in the silica are chiefly released to the vapor phase as the silica is converted to SiC. In the drawing the impurity element in the vapor phase dissolve in the molten getter. The resulting reduction of the concentration of impurity elements in the vapor phase leads to the volatilization of the residual impurity elements in the carbide phase. Those impurity elements also dissolve in the getter where bonding and stress issues are minimal compared to the physical conditions the impurity elements find in SiC. Since SiC was fromed from porous carbon, the carbide has a high surface area improving the rate of volatilization of the impurity element.

Requirements for a Getter

1. High boiling and low melting temperatures.
2. Does not form carbide at critical processing temperatures.
3. Does not wet, or only partially wets SiC.
4. Any one of the following properties; density, magnetic properties, and electro-static characteristics of getter must be significantly different from SiC.
5. The getter element must have a small distribution coefficient so as to remove residual getter element from silicon by unidiretional solidification.

Fig. 7

Milling and Post Treatment

The SiC with the getter containing impurity elements is cooled. The molten getter solidifies, but because it is a metal alloy it is malleable, whereas the SiC is not.

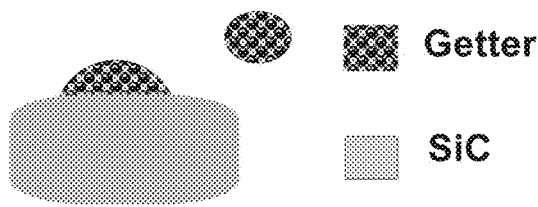

Getter

SiC

Through rod and ball miling the getter and SiC are separated as a result of the difference in malleable charicteristics.

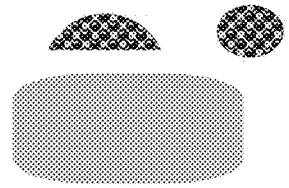

A magnetic filter, or electrostatic separator, or shaker table, or any combination of the three are used to separate the SiC from the getter. A small fraction of the getter will be retained with the carbide.

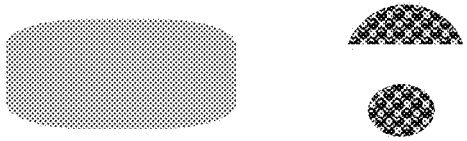

Fig. 8

Milling and Silicon Production in the Plasma Furnace, JHQ-2

(Simplified Drawing for Representation of Chemical Reactions)

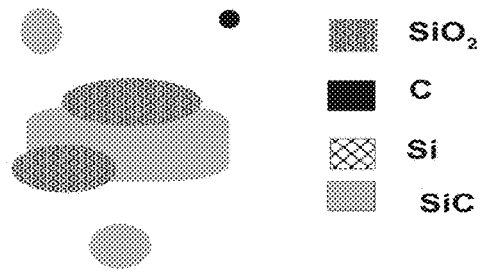

- ▨ SiO₂
- ■ C
- ▩ Si
- ▨ SiC

A ball mill is used to place SiO₂ in contact with SiC. Some C can be added as needed.

At temperatures above 1810°C the reaction between SiO₂ and SiC can't reach equilibrium at ambient pressure, producing SiO(g) and CO(g). The SiO(g) reacts with the SiC producing drops of molten Si and more CO(g).

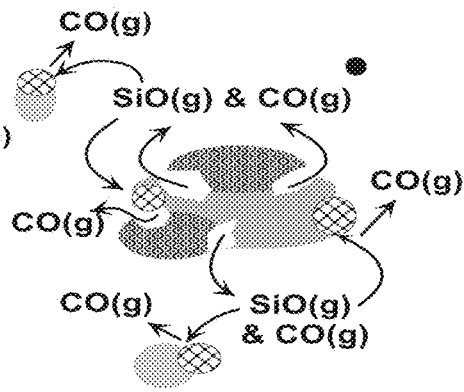

$2SiO_2 + SiC \longrightarrow 3SiO(g) + CO(g)$ $SiO(g) + SiC \longrightarrow 2Si + CO(g)$ When the molten drops of Si contact SiO₂, SiO(g) is produced. This reaction can't be stopped at temperatures above 1880°C and ambient pressure. The SiO(g) reacts with SiC producing more Si and CO(g). With a careful mass balance all the reactants are consumed in production of Si and SiO(g). The excess SiO(g) is oxidized and the resulting silica recycled back the the plasma furnace.

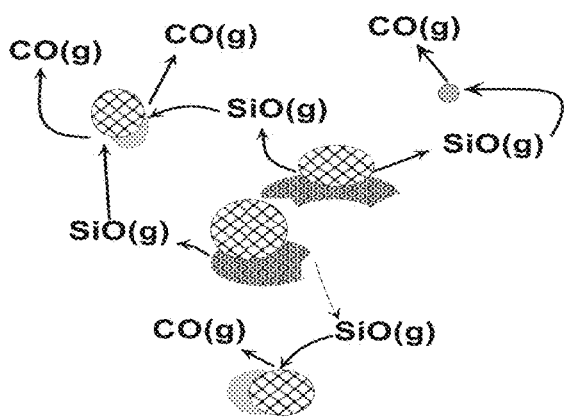

$2SiO_2 + SiC \longrightarrow 3SiO(g) + CO(g)$ $SiO(g) + SiC \longrightarrow 2Si + CO(g)$ A small excess of silica charged to JHq-2 can ensure complete conversion of SiC to Si and CO(g). This approach can be used to eliminate Option 2.

Fig. 9

REFINING PROCESS FOR PRODUCING SOLAR SILICON, SILICON CARBIDE, HIGH-PURITY GRAPHITE AND HOLLOW SILICA MICROSPHERES

The present application claims priority to provisional patent application No. 62/387,860, filed Jan. 8, 2016; and further claims priority to provisional patent application 62/390,884, filed Apr. 13, 2016; the entire contents of which two provisionals are hereby incorporated by reference and set forth herein in their entireties.

BACKGROUND

1. Field of the Invention

The present invention relates to an integrated process for the production and refining of silicon, silica, and carbon products from unrefined ores.

2. Description of Related Art

Silicon dioxide ($SiO_2$) is the most abundant mineral in the earth's crust. The manufacture of silicon for photovoltaics occurs in two stages. First, is the reduction of silica (removal of oxygen) to produce metallurgical grade silicon. It is further refined to produce relatively pure semiconductor grade silicon or an intermediate purity grade often termed solar grade silicon.

Commercial acceptance of solar silicon depends on its impurity content. Thus the goal of any process for refining silicon is to remove impurities with the least cost. The known processes for refining silicon ores (see FIG. 1) typically starts with chunks of quartz and produces a metallurgical-grade silicon (m-Si) with 98.5% purity by employing a submerged arc furnace 10 (see FIG. 2) with very high temperatures in a coke (or coal) and woodchip reduction processing step 10.

Secondary steps 11 through 19 are used to further refine the silicon. The traditional approach for purifying silicon is the Siemens process, developed in the 1950s for the electronics industry. That industry requires, on a mass basis, 99.9999999% pure silicon, a purity represented as 9N (9 nines) pure. Solar grade silicon requires only 6N purity. Thus, with the growth of the solar industry this century, there has been significant interest in developing new lower cost processes for producing silicon intended specifically for that industry.

The primary input to the Siemens process (20) is trichlorosilane ($HSiCl_3$), often abbreviated as TCS. TCS originally produced for the Siemens process was obtained by reacting m-Si with hydrogen chloride gas (HCl(g)), step 11. Today TCS is also produced by reacting m-Si with hydrogen ($H_2$(g)) and silicon tetrachloride ($SiCl_4$(g)), step 12. That approach, in the production of purified silicon, has the advantage of reducing the amount of $SiCl_4$ that must be disposed of. Multiple silanes and impurity chloride vapors produced in steps 11 and 12 are condensed. The resulting liquid in the Siemens process (item 20) undergoes multiple distillations, step 14, with the product being purified TCS. In step 15 the TCS is decomposed, in a batch process, at 1050 to 1150° C. in what is known as a hairpin reactor. The silicon produced in that reactor has a purity of 9N.

An alternative to the Siemens process is converting purified TCS (produced in step 14) to silane ($SiH_4$) in catalytic redistribution columns, step 16. That conversion involves multiple steps that include distillation. A final distillation, step 17, is used to separate the $SiH_4$ from $SiCl_4$. The silane is decomposed in either a hairpin reactor (18) or in a fluidized bed reactor, step 19. Silane decomposes at a lower temperature than TCS, and thus there is a significant energy savings with the alternate process to that of the Siemens process (item 20). The fluidized bed reactor, step 19, has an additional advantage in that it can be operated continuously. The decomposition of $SiH_4$ yields a 6 to 7 nines pure silicon.

Other known methods for producing medium grade purity (6 to 7 nines) of polysilicon, but not shown in FIG. 1, include electron beam refining and the vapor-to-liquid-deposition process by Tokuyama Corporation of Japan.

Upgrading of m-Si (greater than 5N), step 13, can be accomplished by slagging and/or by blowing gases through the silicon melt whereby the boron and phosphorus impurities are removed followed by hydrometallurgical treatment 20, and unidirectional solidification (UDS) 21 to achieve solar grade purity. This approach requires that high purity quartz and coke be processed in the silicon submerged arc furnace (10) to produce a higher purity silicon than the typical metallurgical grade silicon used in the production of TCS in steps 11 and 12. In addition to UDS (not shown in FIG. 1), the Czochralski process may also be used to produce monocrystalline silicon that is useful in making conventional Mono-Si solar cells. Today's cost to produce electronic grade silicon (Siemens process) is approximately $16 to $20 per kilogram. Today's cost to produce medium grade silicon produced by the fluidized bed reactor is approximately $11 per kilogram. The goal of any process to produce Solar Silicon, s-Si, is to produce polysilicon at >5N purity on a metal basis, that has specific SEMI target impurities as indicated by Table I, and which substantially reduces the cost of production

TABLE I

| Impurity Element | SEMI PV17-0611 Specification Category IV |
| --- | --- |
| | Acceptable Concentration |
| Boron | ≤0.38 ± 0.06 ppmw |
| Phosphorus | ≤0.79 ± 0.17 ppmw |
| Carbon | ≤43 ppmw |
| Aluminum | — |
| Transition Metals Ti, Cr, Fe, Ni, Cu, Zn, Mo | ≤200 ppba |
| Alkali and Alkali Earth elements Na, K, Ca | ≤4000 ppba | ppmw—parts per million by weight
ppba—part per billion atomic

Additionally, an unmodified Siemens process produces $SiCl_4$, an environmental hazard. $SiH_4$, used in the alternative to the Siemens process, is explosive and dangerous to handle.

A problem with the use of the submerged arc furnace 10 is that it cannot use low cost powdered silica widely available throughout the world without some other process to convert the powdered ore into briquettes or the like.

SUMMARY OF THE DISCLOSURE

The disclosed process employs low cost silica powder (sand) as its input ore, thereby reducing costs. The disclosed process also eliminates the use of explosive silane in the revised Siemens process and does not produce silicon tetrachloride that must be disposed of as in the unmodified Siemens.

The disclosed process employs unconventional reducing agents (methane, propane or any other hydrocarbon that is easily vaporized). Elimination of solid reductant (coal, coke, and woodchips), as compared to conventional reduction of silica in the submerged arc furnace, eliminates major impurity sources. That advantage has significant consequences:

1. reduction in further refining operations, and
2. more options in ore selection and thus reducing raw materials cost.

The process describe below uses a new plasma furnace design described in, e.g., U.S. Pat. No. 8,253,057, hereby incorporated by reference and set forth here in its entirety. The furnace, variously described as JHQ herein after its inventor Jack Hunt, generates a rotating, donut-shaped disk, "dirty-air," stable plasma whose shape and rotational velocity can be controlled. The size of the donut hole in the plasma is controlled by the size of the inner electrode, while the diameter of the donut-shaped plasma is dictated by the inner diameter of the outer electrode. That electrode forms a concave ring around the inner electrode with a surface area many times greater than that of the inner electrode, thereby ensuring it a long operational life. The inner electrode is a consumable that can be fed continuously for steady state operation of the plasma furnace. The donut-shaped disk plasma is created by superimposing an AC electric field over a DC field. The combined fields significantly increase the volume of the plasma. Both the temperature and thickness of the donut-shaped plasma are dictated by the magnitude of the AC and DC fields. The expanded plasma volume allows for greater mass throughput without extinguishing the plasma, thus the use of the term "dirt-gas" plasma. The size of the plasma furnace can be scaled with the power input. The temperature of the plasma can exceed 4500 degrees C., and thus the electrodes are cooled and protected by an electromagnetic field to extend their operational life.

The residence time of particulate in the plasma can be controlled. The particulate can either pass directly through the plasma or it can be swirled within the donut-shaped plasma. Control of the residence time is dictated by the arrangement of the exit port with respect to the inlet port, and by applying a slight reduction in pressure at the exit port.

The degree of heating particulate in the plasma is dictated by residence time, particulate size, the rate of mass throughput, and power to the plasma. The plasma in the JHQ furnace is capable of rapid heating of particulate, even to the point of entirely vaporizing small particles of carbon coated silica if so desired. Rapid transfer of heat is essential to the process described below, as many of the reactions are highly endothermic. It is the rapid transfer of heat, the high mass throughput, and the physico-chemical longevity of the outer electrode that makes the JHQ plasma furnace ideal for production of solar grade silicon, electronic grade silicon carbide, high purity graphite and hollow silica microspheres.

The process described below produces polysilicon of the required purity at an operational cost of approximately $6 per kilogram. That cost may be reduced even further by subtracting the approximately $3 per kilogram energy produced by the process. The overall cost is significantly less than current alternatives.

BRIEF DESCRIPTION OF THE DRAWINGS

FIG. 4A illustrates a typical silica ore having impurities in form of minerals.

FIG. 4B illustrates pre-treatment option number one.

FIG. 4C illustrates an alternative post-silicon production treatment operation that can be conducted separately (as shown in FIG. 3) or incorporated for example at the JHQ-2 step in the preferred process.

FIG. 6 illustrates the chemistry involved in the formation of silicon carbide in the JHQ-1 plasma furnace.

FIG. 7 illustrates impurity elimination in the JHQ-1 plasma furnace.

FIG. 8 illustrates the milling and posttreatment processes of the silicon carbide output from the JHQ-1 plasma furnace before input into the second JHQ-2 plasma furnace in the preferred process.

FIG. 9 illustrates the milling step and then the silicon production in the JHQ-2 plasma furnace step.

DETAILED DESCRIPTION

Figure 3:
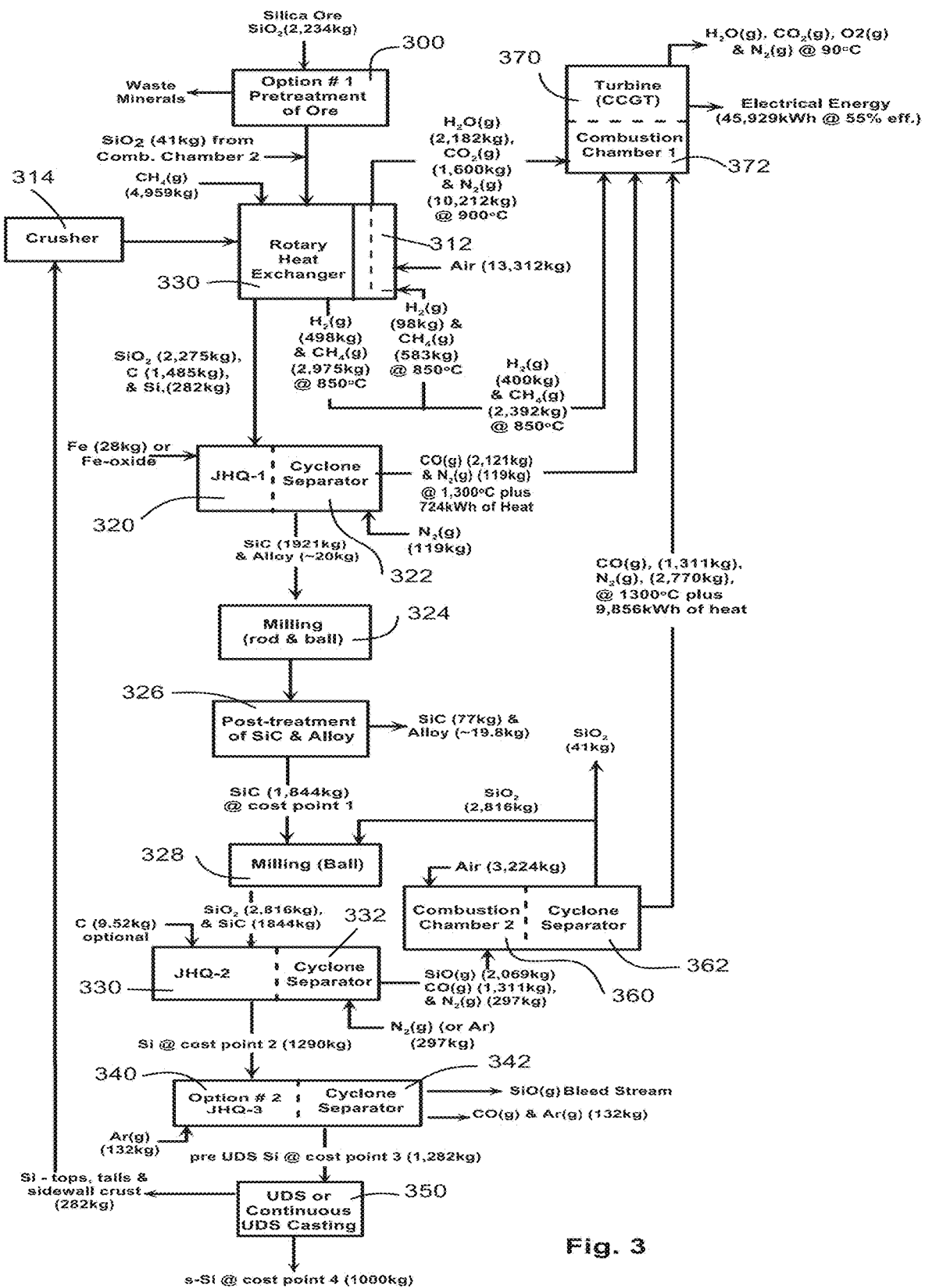
FIG. 3 illustrates a preferred process for producing solar grade silicon that also produces electrical energy.

FIG. 3 is a diagram of an example process for producing solar grade silicon(s-Si). It begins with the input of silica ore and ends with the production of solar grade silicon. It also discloses the production of electrical energy as a byproduct of the process. The example process specifies particular weights or temperatures or other characteristics of the inputs and outputs of the various stages of the process. These are the amounts necessary to produce the given outputs at 100% efficiency unless otherwise indicated. The amounts actually necessary will vary according to the efficiency at any particular step.

The choice ore for the new process is alluvial silica sand. Such ore may contain separate grains of other minerals and add to the impurity content. Analysis of five specimens from a New Zealand ore contained 0.0005 to 0.0079 weight percent heavy minerals (minerals with densities greater than 2.8 g per $cm^3$). These weight percentages correspond to 5 ppmw and 79 ppmw of impurities in the silica, and can contribute as much as 11 ppmw to 168 ppmw in silicon produced from the ore.

In general, when selecting an ore for processing, the focus is on the following impurities B, P, Ca, Al, and Fe. Boron and P are the most difficult elements to remove from silicon, as they do not respond to refining by the unidirectional solidification process ("UDS"). Calcium, Al, and Fe are naturally found with silica in significant concentrations, but Fe readily responds to removal by unidirectional solidification (350), whereas Ca and Al to a significantly lesser extent.

While B is the most difficult element to remove from silicon, there are silica ores with very low content of that impurity (B<0.05 ppmw), more so than an ore with low P content. Phosphorus content in ores suitable for producing s-Si ranges from 1 to 5 ppmw with the preferred process. Ores with less than 0.05 ppmw B, and P from 0.5 to 5 ppmw are available, but Ca and Al contents are high; Al 700 to 1500 ppmw, and Ca 30 to 70 ppmw. These ores should cost between US$0.02 to US$0.10 per kg. One silica waste product from a mining operation in North Carolina has a B content of <0.05, P at 1.0, Ca at 75, Al at 14, and Fe at 2.1 with all numbers in ppmw. The waste product is in powder form and can be purchased at US$0.50 per kg.

The first step 300 in the preferred process removes heavy minerals from the silica ore. Referring to FIG. 4A, these impurities exist in the powdered silica in the form of separate mineral granules. Referring to FIG. 4B, a shaker table, magnetic filter or electrostatic separators or any combination of the three methods may be used to remove the separate impurity minerals. This initial treatment is the first purification operation in the preferred process, and opens up opportunity to use of low cost ore, ore that otherwise would be considered to contain unacceptable impurity content.

Figure 5:
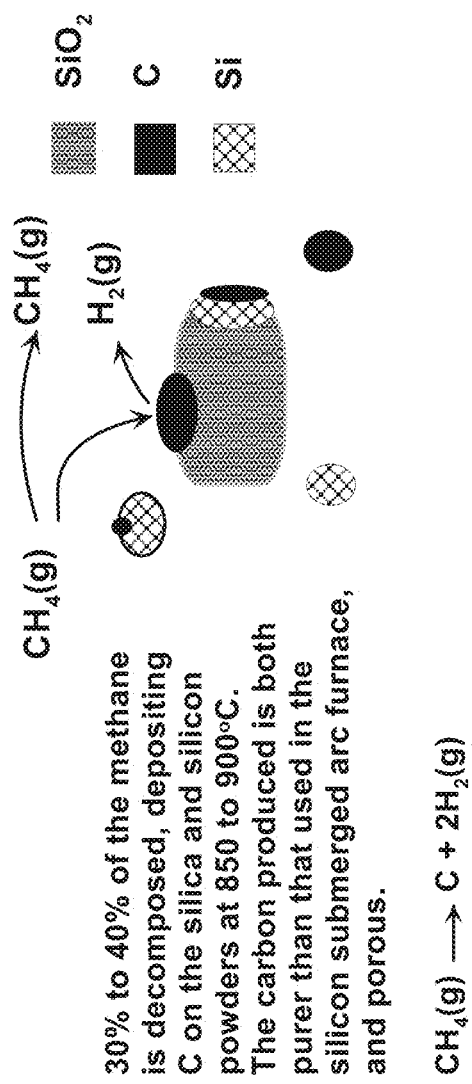
FIG. 5 illustrates the chemistry involved in cracking methane to produce carbon for reducing silicon dioxide.

Referring again to the preferred process for producing solar silicon, the output from our pretreatment step 300 is then charged to a heat exchanger 310. Methane gas and recycled silicon from UDS (350) and crusher (314) are also input to the heat exchanger. The methane is cracked at temperatures below 900° C., specifically at temperatures between 800 to 900° C. The cracking process deposits carbon on the grains of silica. The process is illustrated and described in FIG. 5. Particularly, in the process, 30% to 40% of the methane decomposes into carbon and hydrogen, with the hydrogen and excess methane being expelled and carbon being deposited on the silicon and silicon dioxide particles. The carbon produced in this process is significantly purer than the coke and woodchips used in the silicon submerged arc furnace. This operation represents the second refining operation, namely the use of a high purity reductant. Furthermore, the carbon is porous with a high surface area and is highly reactive.

The carbon deposited on the silica and recycled silicon serves two purposes:
  it decreases agglomeration of the silica powder as it enters the plasma furnace, and
  it places the solid reactants in contact.

Contact leads to $SiO(g)$ formation, which participates in the production of SiC, the desired product from JHQ-1.

With only 40% or less of the methane cracked, more methane is required than that required to supply carbon for producing SiC. While that extra methane increases the raw material's cost, that cost can be recovered several times over if the unused methane is burned in the production of electrical power.

Some of the hydrogen and methane gas exiting the heat exchanger (process step 310) is burned with air in 312 to produce the heat necessary to crack the methane in 310. The hot output gas from 312 is mixed with gases entering the combustion chamber 372, the details of which are described in connection with FIG. 3.

The primary output of the heat exchanger in this process step is both silicon dioxide and a small mass of silicon coated with carbon together with any impurities contained in them. These are charged while still at temperature to the first quantum furnace, JHQ-1 320. Iron or iron oxide (or copper or cuprous oxide), are also charged to the furnace 320 as getters. Details as to the physico-chemical processes occurring in JHQ-1 are presented in FIGS. 6 and 7. Impurities in the silica and recycled silicon are volatilized as the solid reactants are gasified ($SiO$, $CO$ and $CO_2$) and porous carbon is converted to silicon carbide. The impurity elements preferentially dissolve in the molten getter where bonding and physical stress issues are minimal compared to the conditions the impurity elements experience in silicon carbide. After a period of time in the plasma the silicon carbide and getter fall through into a cyclone separator that is charged with a nitrogen gas to prevent unwanted oxygen or other contaminations from the environment. The output from the cyclone separator constitutes carbon monoxide, nitrogen gas at substantial temperatures (1300° C. plus) which are then charged to a combustion chamber 372 which is used to operate a gas turbine generator 370 to produce electrical power.

Startup of the plasma reactor, JHQ-1, requires argon or nitrogen to initiate the hot plasma. Direct charging of the carbon-coated silicon dioxide and recycled silicon to the plasma creates a gaseous environment of $SiO(g)$ and $CO(g)$ that is ionized and thus responds to the electromagnetic fields in the furnace, thereby maintaining the plasma. Argon and nitrogen are not needed after startup of the furnace. Any silicon nitride formed decomposes at temperatures above 1830° C. at ambient pressure. The nitrogen purge of the solid product collected in the cyclone separator prevents back reaction with gasses exiting the plasma furnace. The breaking of the triple bond in $N_2$ is known to be difficult and thus nitride formation is not expected. Furthermore, any silicon nitride formed in JHQ-1 or in the accompanying cyclone separator will be decomposed in JHQ-3 (340) where argon is used to both create the plasma and purge the cyclone separator. Nitrogen is used where practical to reduce cost, but can be substituted with argon if necessary. Particulate charged to JHQ-1 experience several reactions as their temperature increases as presented in FIG. 6. The particles must be heated to 2300° C. or higher for complete conversion of reactants to silicon carbide. Higher temperatures can be tolerated in producing the desired product, silicon carbide, which is formed as particulate as the gas cools leaving the plasma. At approximately 1800° C. silicon carbide and gas are separated using the cyclone separator and the nitrogen purge gas to prevent any back reactions. The furnace is adjustable in terms of plasma shape, size and rotational velocity so that particle temperature can be controlled.

As the furnace heats the materials, the carbon reacts directly with silicon and silicon dioxide where they contact. These reactions tend to be limited by the extent of contact, they tend to trap impurities, initially in the silica and then later in the carbide. The carbon/silicon dioxide reaction cannot be stopped at temperatures above 1521° C., at ambient pressure. Here, silicon dioxide reacts with carbon to produce silicon carbide (SiC) and carbon monoxide ($CO(g)$). Also, any silicon present reacts with carbon to produce SiC. Once the temperature rises above 1700° C. the silicon dioxide/carbon reaction becomes a producer of silicon monoxide, $SiO(g)$, that reacts with carbon to produce SiC and $CO(g)$, however, again, the reaction is limited by the extent of contact between the reactants.

When the temperature exceeds 1800° C., molten silicon reacts with silicon dioxide to produce $SiO(g)$. During this reaction, impurities in the silica enter the molten silicon as the silica is consumed. The concentration of the impurities in the silicon increases with the reaction's consumption of both the silica and the molten silicon in production of SiO(g). As the concentration of the impurities in the silicon increases, more of the impurities are volatilized. With all the molten silicon consumed by the reaction, all the impurities are volatilized, particularly at the high temperatures achieved in the plasma furnace. The extent of this reaction is limited by the amount of silicon not consumed in the reaction between carbon and silicon.

Contact between SiC and silicon dioxide leads to the formation of both SiO(g), and CO(g). This reaction cannot be stopped at temperatures above 1811° C., and ambient pressure. Again the formation of gaseous products leads to the volatilization of impurities in the plasma furnace. Above 2300° C., CO(g) also reacts with silicon dioxide to produce gaseous SiO(g) and carbon dioxide, $CO_2$(g). Carbon dioxide reacts with carbon producing more CO(g) for further reaction with silicon dioxide. The SiO(g) gas also reacts with carbon producing SiC and more CO(g), although this reaction likely occurs at cooler portions of the plasma around 2100° C. The optimum temperature range for the production of silicon monoxide gas through reaction of CO(g) with $SiO_2$ is 2300° C. to 2500° C.

Aluminum and calcium, as noted previously, are typically found in silica ore. They are typically present as oxides and silicates in the silica. With the consumption of the $SiO_2$ by the reactions identified above, the aluminum and calcium remain behind as their oxides; $Al_2O_3$ and CaO. These oxides are very stable, but not at the elevated temperatures in the plasma and in the presence of carbon and silicon carbide. The oxides decompose, aluminum and calcium are volatilized and their vapors dissolve in the getter.

The reaction of $CO_2$(g) with carbon in production of CO(g), and reaction of the CO(g) with silicon dioxide in producing both SiO(g) and more $CO_2$(g), and the reaction of the SiO(g) with carbon in producing SiC and CO(g) ensures that the consumption of silicon dioxide continues in production of the carbide. By employing a careful mass balance all the silicon dioxide can be consumed in the production of SiC and CO(g). However, some silicon loss as SiO(g) may occur. That gas on cooling produces a mixture of Si and $SiO_2$. That mixture can be recycled to JHQ-1 as it is void of impurities. The impurities have been captured with a getter.

Overall the physio-chemical processes occurring in JHQ-1 are:
1. As the carbon coated silica and recycled silicon enters the plasma they are heated, and solid state reactions between C and Si, $SiO_2$ and Si, and C and $SiO_2$ occur, producing SiC, SiO(g), and CO(g). Rapid heating of the particulate takes place within a very small fraction of a second, and where there is contact between the solids the reactions occur. The SiO(g) begins reaction with carbon to produce SiC and more CO(g). Ionized SiO(g) and CO(g) respond to the electromagnetic field and maintains the plasma.
2. Where SiC (produced in 1 above) contacts $SiO_2$, the solids react producing more CO(g) and SiO(g).
3. Upon further heating of the particulate to 2300° C. (again this is accomplished in a very small fraction of a second) the CO(g) in the plasma reacts with $SiO_2$ to produce both SiO(g) and $CO_2$(g), with the latter reacting with C to produce CO(g) that can react with more $SiO_2$.
4. The vast majority of SiC is produced by reaction of SiO(g) with C. The transition of $SiO_2$ to SiO(g) volatilizes impurity elements.
5. The presence of a molten getter acts as a chemical sink for the impurities. The requirements for a getter are presented in FIG. 7.
6. The presence of residual $SiO_2$ and any $Si_3N_4$ formed upon cooling of the solid product are decomposed in the plasma in JHQ-3.

The use of iron or iron oxide, or copper or cuprous oxide as inputs to the JHQ-1 plasma furnace is now explained in connection with FIG. 7. Impurity elements (X) originally locked in the silica are chiefly released to the vapor phase as silica is converted to silicon carbide. In the drawing, the impurity element, in its vapor phase, dissolves in the molten getter, which is iron or copper (other metals that satisfy the requirements presented below can serve as getter), whichever is the input to the furnace or present in the ore. The resulting reduction of the concentration of impurity elements in the vapor phase leads to the volatilization of the residual impurity elements in the carbide phase. Those impurity elements are preferentially dissolved in the getter where bonding and stress issues are minimal compared to the physical conditions of the impurity elements in the silicon carbide. Since silicon carbide was formed from porous carbon, the carbide has a high surface area, improving the rate of volatilization of the impurity element. As illustrated, the getter either partially wets the silicon carbide surface or exists as a separate compound exiting from the furnace.

While the preferred getting material is iron or iron oxide, and referring to FIG. 7, the general requirements for a getter are
1. a high boiling and low melting temperature;
2. does not react with carbon to form a carbide at critical processing temperatures, or is oxidized by the plasma;
3. does not wet, or only partially wets silicon carbide;
4. has properties such as density, magnetic susceptibility, electro static characteristics significantly different from silicon carbide; and
5. have a small distribution coefficient so as to remove residual getter elements from silicon by unidirectional solidification process (350).

It may be necessary to purify the getter for economic reasons and to improve the effectiveness of the getter as a chemical sink for impurity elements in 320. Purification of the getter can be accomplished by passing it through a plasma with purified argon (or purified nitrogen) to volatilize impurities, and thereby have the impurities removed in the gas phase of a cyclone separator. This operation is not included in FIG. 3.

The impurities found in silica ores are volatilized, or enter the metallic alloy (the getter) in JHQ-1, or are retained in the SiC upon carbide formation in JHQ-1. The iron present as a contaminant in the ore, or that charged to the furnace 320, reacts with most impurity elements present to form metallic alloys. The volatilized impurity elements preferentially dissolve in a getter. Molten metals at elevated temperatures take impurity elements into solution, provided the metal reduces the activity of the impurity element. The activity of an element in solution is equal to its concentration in the solution times an activity coefficient. At elevated temperatures the value of the activity coefficient approaches a value of one. Thus, the requirement to reduce the activity of the impurity element, and thereby have it dissolve in the getter, is partially satisfied by having significantly more mass of the getter than mass of the impurity element. This requirement applies individually for each impurity.

The SiC plus getter from JHQ-1 are separated from the gas phase that consists of CO(g) and some volatile impurities in the cyclone separator, 322. Nitrogen gas is slowly passed through the collected solids to provide a protective atmosphere to prevent any back reactions that either oxidize the SiC or promotes retention of impurities leaving the furnace in the gas phase. If iron is used as the getter, cooling of the product must be slowed to allow austenitic iron to transform into ferritic iron. That transformation, later, significantly improves getter removal with a magnetic filter.

The getter in the product leaving JHQ-1 (320) and the cyclone separator (322) exits as a combination of individual drops or as attached to SiC (as partial spherical caps on the carbide as shown in FIG. 8 for partial wetting, or as near spherical particle with only slight attachment to the carbide for a non-wetting getter). The separation of getter from SiC, as presented in FIG. 8, is accomplished by rod and/or ball milling. The difference in malleable characteristics of the getter and SiC make the separation possible; unlike SiC the metallic getter deforms during milling creating stress at the interface between the getter and the carbide that leads to fracture and separation of getter and carbide. Iron and copper have been identified as possible getters as they meet the requirements presented in FIG. 7. Iron is known to partially wet SiC at the processing temperature, where as copper does not. In milling SiC with iron getter, some of the carbide will be retained with the getter when it is separated due to physical interlocking crystals of getter and carbide. Very little SiC will remain with a copper getter.

The getter and the impurities dissolved in it are removed from further processing as presented in FIG. 8. The removal is accomplished by physical means using a magnetic filter, electrostatic separator, or with a shaker table (step 326). The difference in density between SiC and copper is such that a shaker table can be employed, as copper will not respond to a magnetic field. However, a magnetic filter must also be used to remove the abraded iron fines produce in the milling operation (324). SiC is a highly abrasive material that will wear away the rods and balls used in milling. It is essential that the balls and rods be made of ferritic iron that readily responds to a magnetic field. An electrostatic separator can be used to separate metallic getters plus the abraded iron particles from SiC. Multiple treatments in step 326 can be used to remove 99% of the getter, and a similar percentage of impurities dissolved in the getter. This is the third refining operation.

The impurities, in the small percentage of the getter remaining with the SiC, will ultimately be removed from the silicon produced in step 330 through unidirectional solidification in step 350.

The next step is to convert SiC to Si. Referring to FIG. 9, first, pure silicon dioxide from a subsequent step (the JHQ-2 step 330) is charged to a ball mill with the silicon carbide from the posttreatment step 326. The ball milling produces a mixture where SiC and $SiO_2$ are in contact.

That contact is essential to initiate reactions in step 330. Carbon is optionally added at this point as well to initiate reactions in 330. The carbon is only necessary as an initiator, or aide, to maintain the plasma. The carbon must be of high purity to avoid contaminating silicon produced in 330.

This mixture of silicon carbide, and silicon dioxide (plus carbon if needed) is charged to a second JHQ-2 plasma furnace at step 330. As with JHQ-1, the solids are dropped directly into the plasma where they dwell for a period of time while they are heated. During that heating desired reactions take place, not only producing Si but ionized gases that respond to the electromagnetic field in JHQ-2 and thereby maintain the presence of the plasma. The plasma acts as the heat source for the endothermic reactions. The reaction products fall from the plasma into a cyclone separator 332, which has as a separate input nitrogen (or argon) so that the chemical reactions that take place at the elevated temperatures are not interfered with by reverse reactions with the gas leaving the plasma. Argon replaces nitrogen if the option to combine steps 330 and 340 is implemented. More information on that option is provided later.

Here, above 1810° C., the $SiO_2$ and SiC react to produce gas rich in SiO, as presented in FIG. 9. As the temperature of the particulate increases further the SiO(g) reacts with SiC to produce molten Si and CO(g). At the same time reaction between SiC and $SiO_2$ continues, with the SiO(g) produced immediately reacting with the carbide producing more molten silicon. That silicon is now in contact with both the carbide and $SiO_2$. The molten silicon reacts with $SiO_2$ producing more SiO(g) that reacts with SiC to produce more silicon and CO(g). Again the reactants provide the gaseous environment that sustains the plasma. The vast majority of impurities entering JHQ-2 will leave the furnace dissolved in the silicon.

The gas produced in 330 is separated from silicon in the cyclone separator (332). The gas is rich in SiO and CO. Air is mixed with the gas in the combustion chamber (360) where SiO(g) is converted to $SiO_2$, and CO(g) is oxidized to $CO_2$(g). Both reaction release heat that is transferred to the steps where electricity is produced (372 and 370). Before that heat is transferred the $SiO_2$ produced in 360 is separated from the gas in 362. That silica is of high purity, and is recycled to step 328.

The silicon leaving the cyclone separator 332 may contain some particles of SiC, $SiO_2$, and $Si_3N_5$, plus some impurities as noted previously. If the silicon particulate is smaller than 100 microns it must be stored with an inert atmosphere, as the silicon is pyrophoric. Production of larger particles of silicon is encouraged. Some exposure of the silicon particles to air, or air diluted with nitrogen or argon will form a thin $SiO_2$ skin around the particles. This can be accomplished in the cyclone separator (332) as the silicon is cooled. The silica skin plays an important role in eliminating any SiC remaining with the silicon in the final plasma furnace, 340.

The SiC, $SiO_2$, and $Si_3N_5$ particles must either be eliminated or their size reduced to less than 5 microns in the silicon product as the particles interfere with wire sawing of ingots in the productions of wafers. Silicon carbide particles, due to their abrasive properties, are the most objectionable. By heating the silicon in JHQ-3 (340) under an inert atmosphere the unwanted particles of $SiO_2$ and SiC are decomposed as presented in FIG. 4C. Not shown in the figure is that $Si_3N_4$ decomposes at temperatures above 1830° C. at ambient pressure. With argon flushing the reactor and reducing the concentration of nitrogen in the gas, reformation of the nitride is precluded. Both silica particles in contact with silicon, and the thin silica skin surrounding Si particles react at temperatures above 1880° C., producing SiO(g). That reaction eliminates the presence of $SiO_2$ in the final product and produces a gas (SiO) that reacts with SiC, producing Si and CO(g). The overall effect of step 340 is the elimination of $SiO_2$ and $Si_3N_4$, and either partial or total elimination of SiC.

It is uncertain that the reaction between residual $SiO_2$ particulate and molten Si can produce sufficient SiO(g) to eliminate the SiC particles, given that argon is used to create the plasma in JHQ-3 and that that the inert gas may decreases the partial pressure of SiO(g) below that needed for that gas to react with SiC. Thus, it is recommended that additional $SiO_2$ be charged to JHQ-3 (340) in the form of the oxide skin mentioned above so as to produce more SiO(g) to completely eliminate SiC particles from being retained in the silicon product leaving 332. The extra $SiO_2$ will be decomposed in 340 as the reaction between $SiO_2$ and molten Si cannot be stopped at temperatures above 1880° C. and ambient pressure. Flushing the reactor with argon reduces the temperature at which SiO(g) can condense as Si and SiO$_2$. That reduction in the condensation temperature eases the temperature requirements in the cyclone separator 342, where the silicon is separated from the gas phase. It is possible to combine the elimination of particles accomplished in JHQ-3 (340) with the operation of JHQ-2 (330) by heating the solids charged to the plasma to higher temperatures than indicated in FIG. 9. The gas and solid reaction products leaving JHQ-2 330 are cooled to 1900° C., hot argon gas at the same temperature is used to dilute the concentration of SiO in the gas phase, again reducing the ability of the SiO(g) to condense as Si and SiO$_2$. Again the hot gases must be separated from the solids before the reverse reactions can occur. This approach is identified as an option in FIG. 4C.

Figure 1:
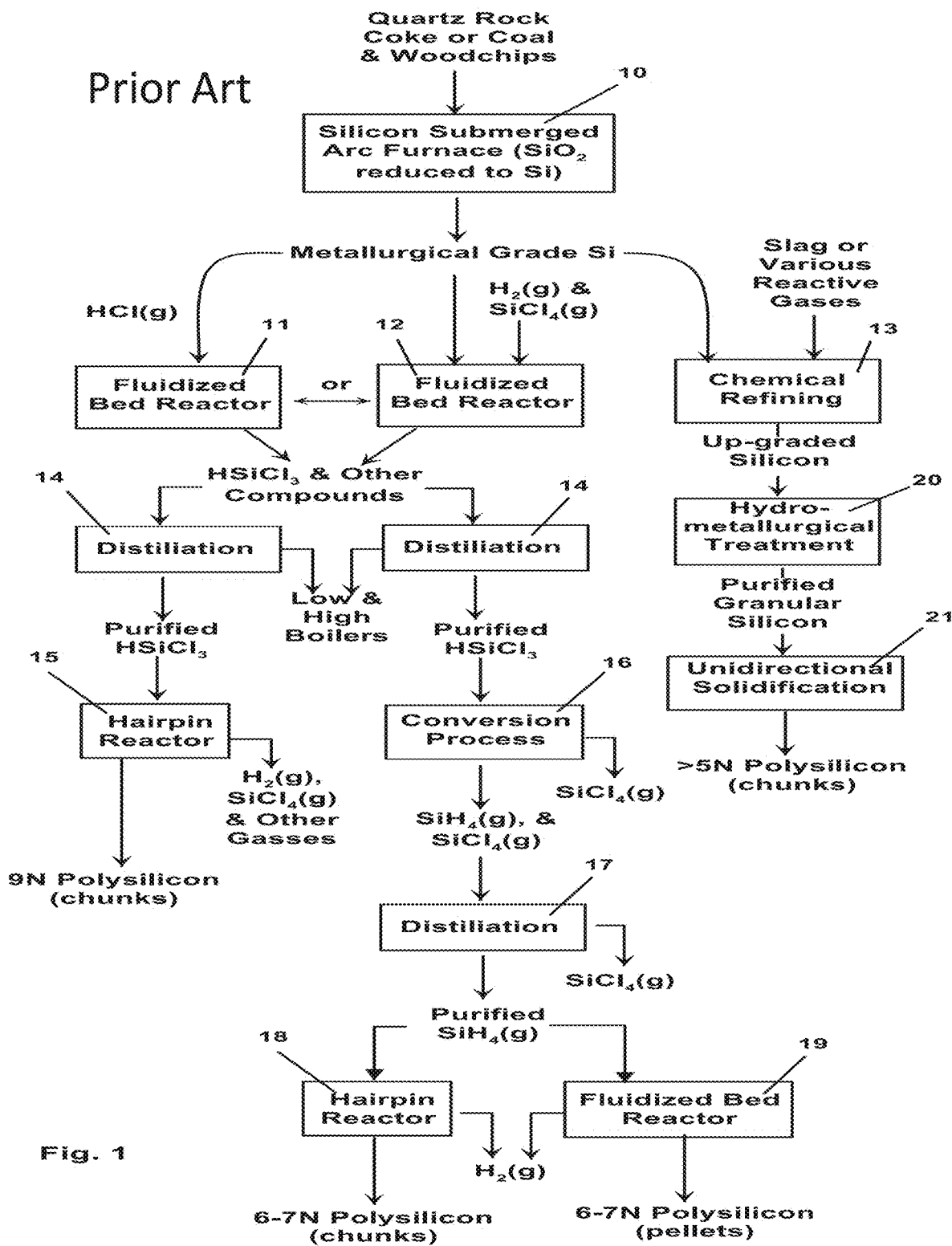
FIG. 1 is a chart showing the prior art processes for producing polysilicon at various purities.
Figure 2:
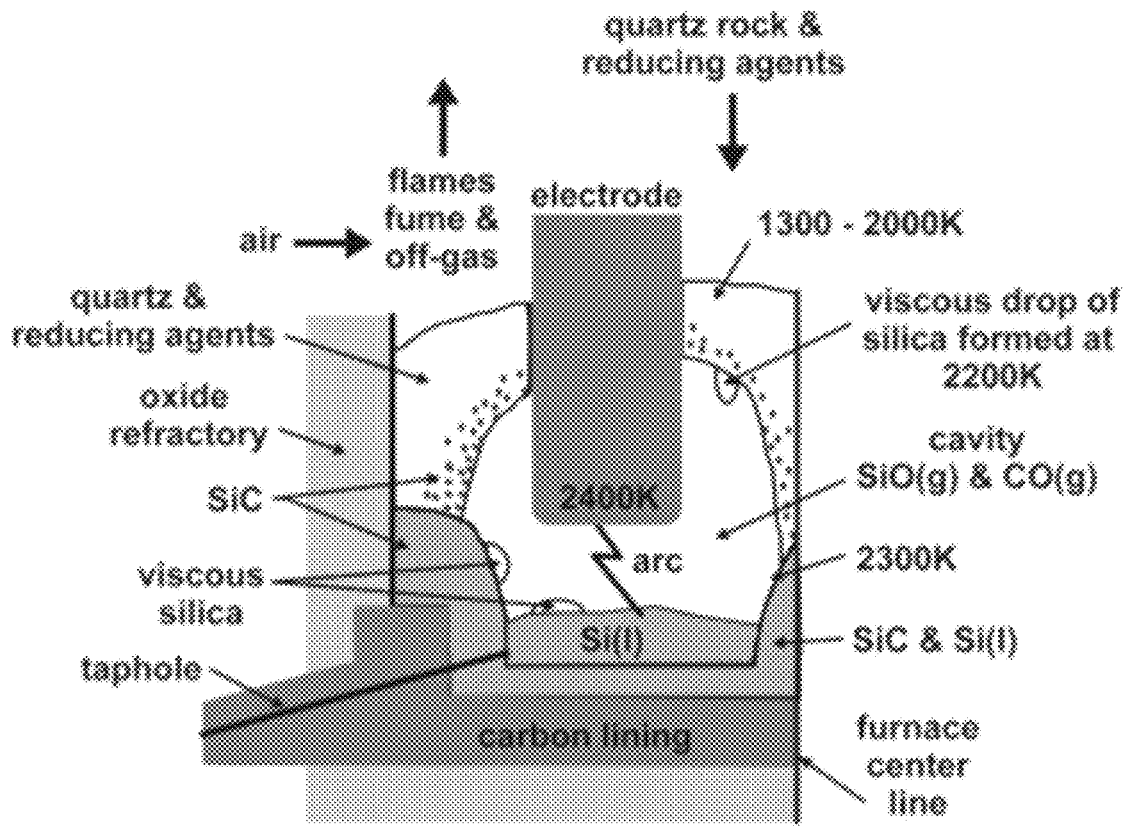
FIG. 2 is an illustration of a prior art coke reduction silica in the silicon submerged arc furnace, and chemical reactions that occur in the furnace for producing metallurgical grade polysilicon.

By oxidizing SiO(g) from JHQ-2 and recycling the resulting SiO$_2$ to the heat exchanger (310) and JHQ-2 (328 and 330), the silicon yield for the two furnace arrangement approaches 100%. In the conventional silicon submerged arc furnaces, Si yield is 80 to 90 percent. Further, and substantial, silicon loss occurs in the subsequent refining processes presented in FIG. 1.

The output of JHQ-3 is silicon (with some dissolved impurities) in lump or granular form. The lumps undergo further purification by unidirectional solidification, UDS (or continuous unidirectional solidification, CUDS) whereby impurities are largely pushed to the ends (top and tail) of the raw ingot, process 350. The primary impurity removed in this operation is the residual portion of the getter remaining in the silicon produced in JHQ-2. The silicon tops, tails and side wall crust from the ingot produced in UDS, together with the powdered form from JHQ-2, is recycled via crusher 314 back to the rotary heat exchanger 310. The process produces solar silicon in ingot form ready for wire sawing at very low cost.

As discussed before, the process also produces energy that can be used to produce electrical energy via a gas turbine 370. Gases from the various stages such as the heat exchanger stage 310 to the JHQ-1 plasma furnace, the cyclone separator 362 which processes gases from JHQ-2, are input to the combustion chamber 372 where they produce substantial heat that is turned into steam to power turbine 370.

The use of cyclone separators with JHQ-1 (320), and JHQ-2 (330) in the preferred process presented in FIG. 3 can be replaced with counter current feed streams with solids entering the plasma furnaces through the gas exiting the furnaces. This is possible as the gas in both furnaces are generated in the plasma, and a getter is used to capture impurities in JHQ-1. The primary difficulty associated with this approach is loss of solid feed through elutriation. Elutriation can be eliminated or minimized through control of the mass feed rate that produces the exit gas, and through multiple feed tubes thereby increasing the cross-sectional area through which the gas must pass and thus reducing its velocity. Particle size, shape, and density are also important factors in reducing elutriation. The advantages with the counter current system are:

1. Greater energy efficiency with heat transferred from the hot exit gases leaving the plasma furnaces to the solid feed.
2. With the heating in 1 above, there is more time for kinetic processes to occur.
3. Loss of SiO(g) in the exit stream in JHQ-1 will be reduced or eliminated by:
   a. reaction of the gas with carbon entering the counter current flow producing SiC, or
   b. the condensation reaction of SiO(g) coating cooler solids SiO$_2$ and Si.
4. Eliminating steps 332, 360, 362, and 328 by allowing the SiO gas to condense as SiO$_2$ and Si on SiC entering JHQ-2. This approach also reduces the energy consumption in JHQ-2, as the reaction is highly exothermic.

Figure 10:
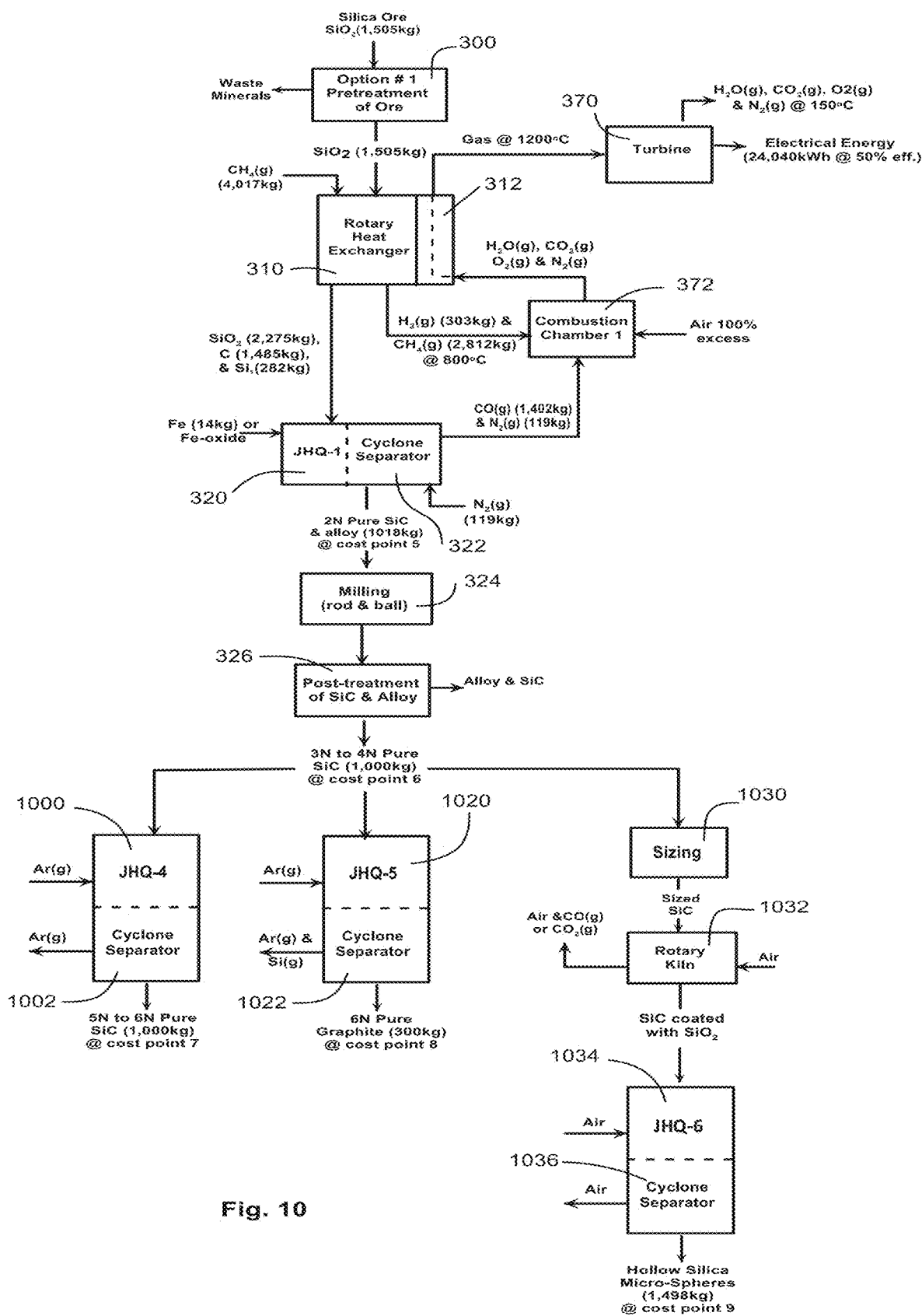
FIG. 10 illustrates modification of the solar silicon process to produce pure silicon carbide, high purity graphite or hollow silica microspheres.

Referring to FIG. 10, the process can also be used to produce silicon carbide in excess of 5N purity, pure graphite in excess of 6N purity, and hollow silica microspheres. The materials are processed from step 300 (optional or processing) through step 326 (post treatment of silicon carbide and alloys) as described above.

There is one modification, the choice of getter is expanded since removal of the residual getter in the carbide, that enters the silicon, no longer needs to be removed by unidirectional solidification, step 350 in FIG. 3. With that restriction eliminated, other possible getters are tin, nickel, and cobalt. Tin, like copper, does not wet SiC, and has substantially greater density than the carbide, such that it can be removed by a shaker table. Nickel and cobalt both wet SiC less than iron, and both can be removed with a magnetic filter. All three elements can be separated from SiC using an electrostatic separator.

As discussed above, at this stage in the process, primarily silicon carbide is present, with dissolved impurities although there remains some silicon nitride and silicon dioxide. To eliminate the presence of silicon dioxide in the product leaving 320 it is suggested that excess carbon be charged to the plasma furnace. Silicon nitride, as noted previously decomposes at temperatures above 1830° C. and ambient pressure. Furthermore, it is difficult to break the triple bond in N$_2$, and thus little, if any, Si$_3$N$_4$ is expected to form. If the nitride formation becomes a problem, argon can be used to shield the solid product leaving JHQ-1 instead of nitrogen.

The 3N to 4N SiC leaving JHQ-1 can be used to produce 5N to 6N (or higher) pure SiC, high purity graphite, or hollow silica micro-spheres, HSMS Increasing the purity of the SiC leaving the post-treatment (326) is accomplished by passing the carbide through an additional plasma furnace 1000. The degree to which impurities are removed is dependent on the temperature to which the silicon carbide is heated to, the residence time in the plasma, the concentration of impurities in the carbide, and the mass ratio of purified argon to mass of SiC charged to JHQ-4 (1000). By heating SiC to a temperature below its decomposition temperature (approximately 3100° C., although some estimates are as low as 2800° C.) in the argon plasma, the mass of impurity in the SiC is partitioned between carbide and the gas phase. Increasing the ratio of mass of argon to mass of SiC further reduces the final impurity content in the carbide. To minimize any possible back reactions, the carbide and gas should be separated at an elevated temperature in the cyclone separator (1002), or additional argon can be added to the gas leaving 1000 to achieve the same result. Kinetic issues such as SiC particle size and surface area plus residence time in the plasma impact the rate of volatilization of impurities.

High purity graphite is produced by charging the particle output from the post treatment step 326 as input to JHQ-5 furnace 1020 with an argon plasma and an argon cyclone separator. The furnace is operated at temperatures of 4200° C. to volatilize the silicon and impurities, producing purified graphite.

Hollow silica micro-spheres are optionally formed by process steps 1030-1036, and in further reference to FIG.

11A-11B and Table II. Silicon carbide particles from 326 are input to the sizing step 1030 where particles are separated by size having diameters of between 0.04 to 200 microns.

The particles of a specific size are then charged to a rotary kiln 1032 to produce an oxide layer on the exterior surface of the carbide particles. Sizing ensures a uniform final product. An oxidizing atmosphere (air, $O_2$, $CO_2$, or a mixture of any of the gases with an inert) is reacted with the SiC to produce $SiO_2$ plus a carbon containing gas. The SiC and oxidizing gas is heated to a temperature of 1400° C. or lower. The choice of temperature depends on the activity of oxygen in the gas, desired thickness of the oxide on the SiC particulate, and the time to achieve the desired thickness of the oxide layer. Higher activity of oxygen and higher temperatures decreases the time to achieve the desired thickness of the oxide layer (Example; time to produce 15-micron thick layer at 1200° C. and a partial pressure of $O_2$=1.0 atm is 1 hour versus 2.26 hours with the partial pressure of $O_2$=0.2 atm). An alternative approach to coating the carbide particle with a silica layer (not shown in FIG. 10) is to coat the SiC particle with fine silica powder (possibly that from operation 362 in FIG. 3) with either a silicone or hydrocarbon adhesive. This approach, while technically easier than using the rotary kiln, has less control as to the mass of silica coating the carbide particle. The mass of silica coating a SiC particle must, on a molar basis, be more than twice that of the carbide.

Figure 11A:
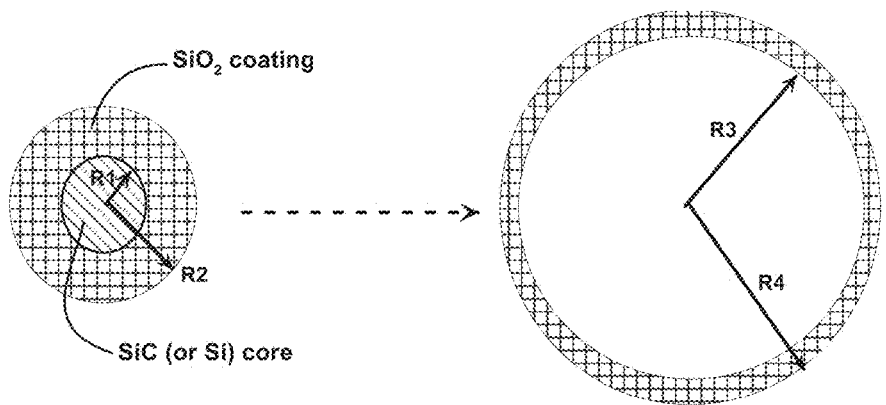
FIG. 11A illustrates the process of producing hollow silicon spheres from silica coated silicon carbides (or silicon).
Figure 11B:
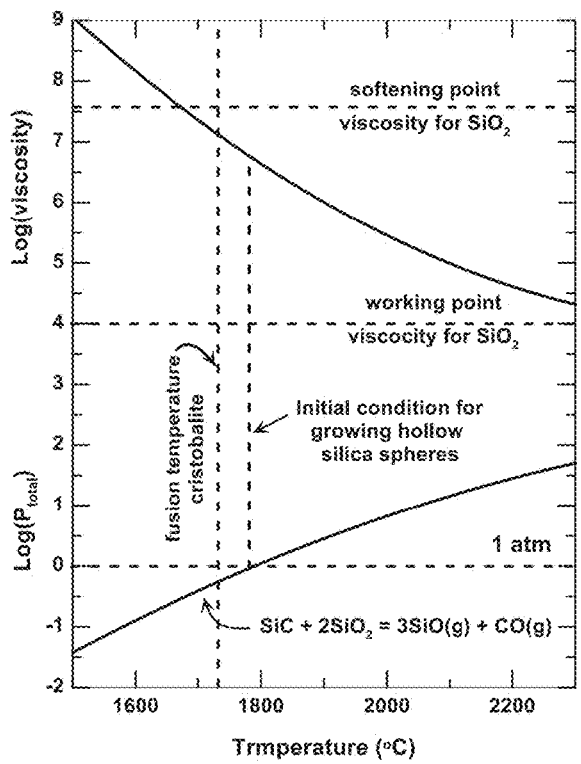
FIG. 11B illustrates the relationship of the viscosity of silica to the pressure created by the $SiC-SiO_2$ reaction necessary to form the hollow sphere.

The coated particles are input to JHQ-6 plasma furnace 1034 using air (or an inert gas). Upon heating the particulate to temperatures above 1500° C. the silica layer forms an impervious layer isolating the SiC particle from further contact with the surrounding gas. As the temperature of the composite particulate increases the silicon carbide is reacted with the silicon dioxide producing SiO(g) and CO(g). The pressure of the gas, in equilibrium with the solid reactants, rises to 1 atmosphere at a temperature of approximately 1816° C. At that temperature the viscosity of the fused silica is about an order of magnitude lower than the softening point viscosity as shown in FIG. 11B. Increasing the temperature of the particulate, the reaction between $SiO_2$ and SiC tries to produce a gas with a pressure greater than 1 atmosphere. Initially at temperatures only slightly above 1816° C. and with the furnace operated at ambient pressure, the fused silica will resist the increase in pressure, but will begin to expand slowly to return the internal gas pressure to 1 atmosphere. If the silica shell ruptures the oxidizing atmosphere will form another $SiO_2$ skin on the surface of SiC. That reaction is highly exothermic, raising the temperature of the new silica skin and reducing its viscosity. The newly formed shell expands healing the original rupture. An alternative approach to avoid ruptures is to operate the plasma furnace at pressures greater than 1 atmosphere. (Example: Operating the furnace at a total pressure of 3.5 atmospheres the internal pressure created by the reaction between $SiO_2$ and SiC equals the external pressure at 1957° C. At that temperature the viscosity of the silica is two orders of magnitude lower than that at the softening point.) By raising the temperature of the composite particle above that temperature where the inner pressure produced by the two reactants exceeds the pressure in the plasma reactor, the softened silica shell expands until all the SiC is consumed by the reaction as shown in FIG. 11A.

Figure 11C:
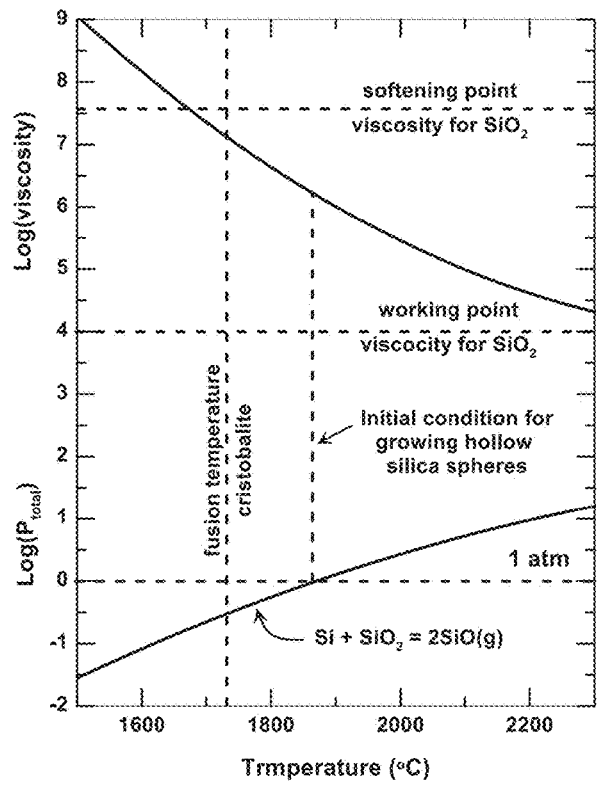
FIG. 11C illustrates the relationship of the viscosity of silica to the pressure created by the $Si-SiO_2$ reaction necessary to form the hollow sphere.

Silicon particulate formed in JHQ-2 (330) can be substituted for SiC entering the sizing operation (1030) in FIG. 10. The silicon particles are coated by either means used in coating SiC. The coating on a molar basis of silica to silicon must be greater than 1. The resulting particle of Si coated in $SiO_2$ is charges to the plasma furnace 1034. The reaction between Si and $SiO_2$ produces SiO(g). The physical processes for the growth of the hollow silica sphere are the same as those described for the SiC—$SiO_2$ combination. The temperatures involved are slightly different as presented in FIG. 11C.

The reactions for the growth of the hollow spheres for the two chemical systems are

$$SiC + 2SiO2 \rightarrow 3SiO(g) + CO(g) \quad (E1)$$

and

$$Si(l) + SiO2 \rightarrow 2SiO(g) \quad (E2)$$

The hollow silicon dioxide spheres must be rapidly quenched to retain their size. The decrease in temperature decreases the pressure of the gas inside the hollow sphere, but that decrease in temperature also increases the viscosity of the silica shell. Some reduction in size is expected. The wall thickness of the sphere will increase. The overall shape will remain spherical, as the surface energy is minimized with the spherical shape.

The gas inside the hollow spheres on cooling will undergo the reverse of reactions E1 and E2, decreasing the total pressure inside the hollow sphere. However, the reduction in pressure (below 1 atmosphere) will occur at temperatures where the viscosity of the silica is high enough to prevent any further reduction in the size of the sphere. The gas pressure inside the spheres formed with the Si—SiO2 system will go toward zero upon cooling, as the reverse of reaction E2 is known to readily occur at temperatures below 1427° C. That loss of the gas phase increases the resistance of the hollow sphere to thermal heat transfer, a property valued by consumers. The degree that the gas pressure declines in spheres formed with the SiC—SiO2 system is uncertain.

Table II sets forth the correspondence of the size of the silicon carbide particles input to the process with the size of the resulting hollow spheres. The values in the table represent just a few examples of the size of hollow spheres that can be formed with SiC coated with $SiO_2$. See, FIG. 11A that illustrates the overall process and what the R1, R2, R3 and R3 in the table measure. In particular, R1 is the radius of the silicon carbide core of the input particle, R2 is the radius of the silicon dioxide coating of the input particle, R3 is the radius of the inner wall of the silicon dioxide wall of the hollow sphere, and R4 is the radius of the outer surface of the silicon dioxide wall of the hollow sphere produced by the present process.

TABLE II

| SiC diammeter, $d_1$ (microns) | Overall initial particle diameter, $d_2$ ($2r_2$) (microns) | Inside diammeter of hollow sphere, $d_3$ ($2r_3$) (microns) | Outside diameter of hollow sphere, $d_4$ ($2r_4$) (microns) | Wall thickness (microns) | Density of hollow sphere (g/cm$^3$) | Weight change per unit area for conversion of SiC to SiO$_2$ (mg/cm$^2$) |
|---|---|---|---|---|---|---|
| \multicolumn{7}{c}{P = 1 bar and T = 1927° C.} |
| 0.04 | 0.8 | 1.529 | 1.599 | 0.035 | 0.275 | 0.035 |
| 0.04 | 1.0 | 1.529 | 1.660 | 0.065 | 0.48 | 0.045 |
| 0.05 | 1 | 1.912 | 1.999 | 0.044 | 0.275 | 0.044 |
| 0.10 | 2 | 3.823 | 3.998 | 0.087 | 0.275 | 0.088 |
| 0.15 | 2 | 5.735 | 5.815 | 0.040 | 0.089 | 0.084 |
| 0.15 | 3 | 5.735 | 5.996 | 0.131 | 0.275 | 0.133 |
| 0.20 | 2 | 7.647 | 7.692 | 0.023 | 0.039 | 0.080 |
| 0.20 | 3 | 7.647 | 7.797 | 0.075 | 0.125 | 0.128 |
| 0.20 | 4 | 7.647 | 7.995 | 0.174 | 0.275 | 0.177 |
| 0.20 | 5 | 7.647 | 8.301 | 0.327 | 0.48 | 0.225 |
| 0.30 | 3 | 11.47 | 11.538 | 0.034 | 0.039 | 0.121 |
| 0.30 | 4 | 11.47 | 11.629 | 0.08 | 0.089 | 0.169 |
| 0.30 | 6 | 11.47 | 11.993 | 0.261 | 0.275 | 0.265 |
| 0.30 | 8 | 11.47 | 12.463 | 0.586 | 0.556 | 0.362 |
| \multicolumn{7}{c}{P = 1 bar and T = 2327° C.} |
| 0.04 | 0.8 | 1.613 | 1.676 | 0.032 | 0.239 | 0.035 |
| 0.04 | 1.0 | 1.613 | 1.732 | 0.060 | 0.423 | 0.045 |
| 0.05 | 1 | 2.016 | 2.095 | 0.039 | 0.239 | 0.044 |
| 0.10 | 2 | 4.032 | 4.19 | 0.079 | 0.239 | 0.088 |
| 0.15 | 2 | 6.049 | 6.121 | 0.036 | 0.077 | 0.084 |
| 0.15 | 3 | 6.049 | 6.285 | 0.118 | 0.239 | 0.133 |
| 0.15 | 4 | 6.049 | 6.583 | 0.267 | 0.493 | 0.181 |
| 0.20 | 2 | 8.065 | 8.106 | 0.020 | 0.033 | 0.080 |
| 0.20 | 3 | 8.065 | 8.201 | 0.068 | 0.108 | 0.128 |
| 0.20 | 4 | 8.065 | 8.38 | 0.158 | 0.239 | 0.177 |
| 0.20 | 5 | 8.065 | 8.66 | 0.298 | 0.423 | 0.225 |
| 0.30 | 3 | 12.097 | 12.158 | 0.030 | 0.033 | 0.121 |
| 0.30 | 4 | 12.097 | 12.241 | 0.072 | 0.077 | 0.169 |
| 0.30 | 6 | 12.097 | 12.57 | 0.236 | 0.239 | 0.265 |

The invention claimed is:

1. A method for generating a purified product from a starting material including silica, said method comprising:
   heating silica in the presence of a hydrocarbon to produce silica and carbon, with at least some of said carbon being adhered to at least some of said silica;
   combining said carbon and said silica with carbon adhered thereto with a getter in a first rotating, stable, dirty-air plasma, said first rotating, stable, dirty-air plasma comprising silicon monoxide gas and/or carbon monoxide gas, and the temperature of said first rotating, stable, dirty-air plasma being controllable;
   heating the material in said first rotating, stable, dirty-air plasma to volatize impurities in said silica, dissolve said impurities in said getter, and produce silicon carbide; and
   collecting said silicon carbide and said getter from said first rotating, stable, dirty-air plasma, said getter having said impurities contained therein.

2. The method of claim 1, further comprising physically separating said collected silicon carbide and said getter using ferritic iron rod and/or ferritic iron ball milling.

3. The method of claim 2, further comprising:
   combining said separated silicon carbide with additional silica in a second rotating, stable, dirty-air plasma; and
   heating in said second rotating, stable, dirty-air plasma said separated silicon carbide and said additional silica to produce silicon particles.

4. The method of claim 3, further comprising heating said silicon particles in a third rotating, stable, dirty-air plasma with an inert atmosphere to decompose unwanted particles remaining in said silicon, said unwanted particles including leftover silicon carbide.

5. The method of claim 4, wherein said second rotating, stable, dirty-air plasma and said third rotating, stable, dirty-air plasma are separate plasmas.

6. The method of claim 4, wherein said step of heating said silicon particles in said third rotating, stable, dirty-air plasma includes heating said silicon particles in the presence of additional silica to eliminate said leftover silicon carbide.

7. The method of claim 6, further comprising exposing said silicon particles to an oxidizing atmosphere to form oxide layers on said silicon particles, said oxide layers constituting said additional silica.

8. The method of claim 4, further comprising purifying said silicon particles from said third rotating, stable, dirty-air plasma by unidirectional solidification (UDS).

9. The method of claim 8, wherein:
   said step of heating silica in the presence of said hydrocarbon includes heating said silica in a rotary heat exchanger in the presence of methane to produce carbon-coated silicon in addition to said carbon and said silica with carbon adhered thereto;
   said first rotating, stable, dirty-air plasma includes gaseous silicon monoxide and carbon monoxide and is produced in a furnace that facilitates control of rotation, shape and temperature of said rotating, stable, dirty-air plasma;
   said step of heating the material in said first rotating, stable, dirty-air plasma to volatize impurities in said silica includes heating the material in said first rotating, stable, dirty-air plasma to 2300° C.;
   said step of collecting said silicon carbide and said getter from said first rotating, stable, dirty-air plasma includes allowing said silicon carbide and said getter having said impurities contained therein to fall through said first rotating, stable, dirty-air plasma into a first cyclone separator;

said step of combining said separated silicon carbide with additional silica includes milling said collected silicon carbide with substantially pure silica to produce an output of silicon carbide and silica;

said step of heating said separated silicon carbide with said additional silica includes charging said output of silicon carbide and silica into said second rotating, stable, dirty-air plasma, said second rotating, stable, dirty-air plasma comprising gaseous silicon monoxide and carbon monoxide;

said step of heating said separated silicon carbide and said additional silica includes heating said silicon carbide and said additional silica in said second rotating, stable, dirty-air plasma to temperatures above 1880° C. whereby said silicon particles, silicon monoxide, and carbon monoxide are produced, said silicon particles falling out of said second rotating plasma into a second cyclone separator;

charging said second cyclone separator with nitrogen or argon to allow cooling of said silicon particles to a temperature below 1800° C. without a reverse reaction;

said step of heating said silicon particles in said third rotating, stable, dirty-air plasma includes charging said silicon particles and additional silicon dioxide into said third rotating, stable, dirty-air plasma, said third rotating, stable, dirty-air plasma comprising argon;

said step of heating said silicon particles in said third rotating, stable, dirty-air plasma includes heating said silicon particles and said additional silicon dioxide to a temperature above 1830° C. to decompose silicon nitride, and react said silicon particles and silicon dioxide to produce silicon monoxide that reacts with residual silicon carbide producing silicon and carbon monoxide, the latter drawn off in a third cyclone separator, leaving silicon in the form of chunks and/or granules;

said step of purifying said silicon particles from said third rotating, stable, dirty-air plasma includes processing said silicon chunks or granules through UDS to produce solar silicon; and further comprising charging said first cyclone separator with nitrogen to allow cooling of said silicon carbide and said getter to a temperature below 1800° C. without a reverse reaction; and charging said second cyclone separator with nitrogen or argon to allow cooling of said silicon particles to a temperature below 1800° C. without a reverse reaction.

10. The method of claim 9, wherein said step of heating silica in the presence of said hydrocarbon includes charging recycled silicon UDS waste from said step of processing said silicon chunks or granules into said rotary heat exchanger.

11. The method of claim 9, further comprising charging gas exiting said second rotating, stable, dirty-air plasma to a combustion chamber associated with said second rotating, stable, dirty-air plasma and further charged with air to produce solid and high purity silicon dioxide and gaseous carbon monoxide and nitrogen.

12. The method of claim 11, further comprising charging said gas exiting said combustion chamber to a turbine combustion chamber to drive a turbine producing electrical energy.

13. The method of claim 12, further comprising charging gas exiting said first rotating, stable, dirty-air plasma to said rotary heat exchanger and said turbine combustion chamber.

14. The method of claim 12, further comprising charging gas exiting said rotary heat exchanger to said turbine combustion chamber.

15. The method of claim 9, wherein said getter comprises iron or iron, an oxide of iron, copper, or an oxide of copper.

16. The method of claim 9, wherein said step of physically separating said collected silicon carbide and said getter further comprises removing said getter from said silicon carbide using a magnetic filter, an electrostatic separator and/or a shaker table.

17. The method of claim 16, further comprising slowing the cooling of the output of said first rotating, stable, dirty-air plasma to allow austenitic iron of said getter to transform into ferric iron.

18. The method of claim 9, further comprising charging pure carbon to said second rotating, stable, dirty-air plasma.

19. The method of claim 3, wherein said step of heating said separated silicon carbide and said additional silica includes heating said separated silicon carbide and said additional silica to temperatures above 1880° C. to consume all of said separated silicon carbide.

20. The method of claim 19, further comprising purifying said silicon particles from said second rotating, stable, dirty-air plasma by unidirectional solidification (UDS).

21. The method of claim 2, further comprising heating said collected silicon carbide in a second rotating, stable, dirty-air plasma with an inert atmosphere to a temperature below the decomposition temperature of silicon carbide to produce purified silicon carbide.

22. The method of claim 21, wherein said step of heating said collected silicon carbide in said second rotating, stable, dirty-air plasma includes heating said collected silicon carbide to a temperature below 3100° C.

23. The method of claim 22, wherein:
said step of heating silica in the presence of said hydrocarbon includes heating said silica in a rotary heat exchanger in the presence of methane to produce said carbon and said silica with carbon adhered thereto;

said first rotating, stable, dirty-air plasma includes gaseous silicon monoxide and carbon monoxide and is produced in a furnace that facilitates control of rotation, shape and temperature are controllable of said rotating, stable, dirty-air plasma;

said step of heating the material in said first rotating, stable, dirty-air plasma to volatize impurities in said silica includes heating the material in said first rotating, stable, dirty-air plasma to 2300° C.;

said step of collecting said silicon carbide and said getter from said first rotating, stable, dirty-air plasma includes allowing said silicon carbide and said getter having said impurities contained therein to fall through said first rotating, stable, dirty-air plasma into a first cyclone separator; and said step of heating said collected silicon carbide in said second rotating, stable, dirty-air plasma includes charging argon gas and said collected silicon carbide into said second rotating, stable, dirty-air plasma and there heating said collected silicon carbide to above 1830° C. to remove silicon nitride and volatile impurities.

24. The method of claim 23, further comprising withdrawing particulate matter from said second rotating, stable, dirty-air plasma through a second cyclone separator that is charged with argon gas.

25. The method of claim 23, wherein said getter comprises iron, copper, tin, nickel or cobalt, or oxides thereof.

26. The method of claim 21, further comprising separating said collected silicon carbide from said inert atmosphere at a temperature high enough to prevent back-reactions.

27. The method of claim 21, further comprising heating said collected silicon carbide in said second rotating, stable, dirty-air plasma with an inert atmosphere to a temperature above the decomposition temperature of silicon carbide to produce purified graphite.

28. The method of claim 27, wherein said step of heating said collected silicon carbide in said second rotating, stable, dirty-air plasma includes heating said collected silicon carbide to a temperature above 3100° C.

29. The method of claim 28, wherein:
said step of heating silica in the presence of said hydrocarbon includes heating said silica in a rotary heat exchanger in the presence of methane to produce said carbon and said silica with carbon adhered thereto; said first rotating, stable, dirty-air plasma includes gaseous silicon monoxide and carbon monoxide and is produced in a furnace that facilitates control of rotation, shape and temperature of said first rotating, stable, dirty-air plasma;
said step of heating the material in said first rotating, stable, dirty-air plasma to volatize impurities in said silica includes heating the material in said first rotating, stable, dirty-air plasma to 2300° C.; and
said step of collecting said silicon carbide and said getter from said first rotating, stable, dirty-air plasma includes allowing said silicon carbide and said getter having said impurities contained therein to fall through said first rotating, stable, dirty-air plasma into a first cyclone separator; and further comprising
charging argon gas and said collected silicon carbide into said second rotating, stable, dirty-air plasma and there heating said collected silicon carbide to above 4200° C. to produce purified graphite.

30. The method of claim 2, further comprising separating said collected silicon carbide particles into groups with sizes ranging from 0.04-200 microns.

31. The method of claim 30, further comprising heating said silicon carbide particles of one said groups in an oxidizing atmosphere to produce oxide layers on said silicon carbide particles of said one of said groups.

32. The method of claim 31, further comprising heating said silicon carbide particles of said one of said groups with said oxide layers produced thereon in a second rotating, stable, dirty-air plasma until said silicon carbide particles of said one of said groups react with said oxide layers to produce hollow silica micro-spheres.

33. The method of claim 2, further comprising heating said collected silicon carbide with an oxidizing atmosphere to produce oxide layers on individual particles of said collected silicon carbide.

34. The method of claim 33, further comprising heating said individual particles of said collected silicon carbide until said individual particles of said collected silicon carbide react with said oxide layers to produce hollow silica micro-spheres.

35. A process, comprising:
a. charging impurity containing silica into a rotary heat exchanger in the presence of methane to produce carbon-coated silica, and carbon;
b. charging the output of step a to a first rotating plasma together with a getter, the plasma comprising gaseous silicon monoxide and carbon monoxide; the plasma being a rotatable, stable dirty-air plasma whose rotation, shape and temperature are controllable;
c. heating the material in the plasma to 2300° C. to volatize impurities in the silica, dissolve these volatized impurities in the getter, and produce silicon carbide and a getter with dissolved impurities; wherein silicon carbide and the getter with dissolved impurities fall through the plasma in to a cyclone separator;
d. charging the cyclone separator of step c with nitrogen to allow cooling of the silicon carbide and getter to a temperature below 1800° C. without a reverse reaction;
e. mechanically processing the output from step d to separate the getter from the silicon carbide;
f. removing the getter from the silicon carbide;
h. sizing of the silicon carbide and separating the different size particles with diameters of between 0.04 to 200 µm;
i. charging air and the sized output of step h to a rotary kiln to produce an oxide layer on the exterior surface of the sized silicon carbide particles;
j. charging air and the output from step i into a second rotating plasma and there heating the particulate to above 1816° C. to produce hollow silica spheres; and
k. rapidly quenching the hollow silica spheres in a cyclone separator as the particles emerge from the second rotating plasma.

36. The process of claim 35, further comprising operating the second rotating plasma at pressures greater than one atmosphere.

* * * * *